(12) United States Patent
Srinivasan

(10) Patent No.: US 7,096,189 B1
(45) Date of Patent: Aug. 22, 2006

(54) METHODS AND SYSTEM FOR PROCESSING CHANGES TO EXISTING PURCHASE ORDERS IN AN OBJECT-ORIENTED ORDER PROCESSING SYSTEM

(75) Inventor: Subramanian Srinivasan, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 922 days.

(21) Appl. No.: 09/759,540

(22) Filed: Jan. 12, 2001

(51) Int. Cl.
G06F 17/30 (2006.01)
G07F 7/00 (2006.01)

(52) U.S. Cl. ................................ 705/11; 707/104.1
(58) Field of Classification Search .................. 705/1, 705/10, 26, 22; 707/104.1
See application file for complete search history.

(56) References Cited

U.S. PATENT DOCUMENTS

| | | | |
|---|---|---|---|
| 4,799,156 A * | 1/1989 | Shavit et al. | 705/26 |
| 5,191,534 A * | 3/1993 | Orr et al. | 700/105 |
| 5,666,493 A * | 9/1997 | Wojcik et al. | 705/26 |
| 5,694,551 A * | 12/1997 | Doyle et al. | 705/26 |
| 5,758,329 A * | 5/1998 | Wojcik et al. | 705/28 |
| 5,870,717 A * | 2/1999 | Wiecha | 705/26 |
| 5,970,475 A * | 10/1999 | Barnes et al. | 705/27 |
| 5,987,423 A * | 11/1999 | Arnold et al. | 705/14 |
| 6,058,373 A * | 5/2000 | Blinn et al. | 705/26 |
| 6,067,525 A * | 5/2000 | Johnson et al. | 705/10 |
| 6,085,171 A * | 7/2000 | Leonard | 705/26 |
| 6,539,386 B1 * | 3/2003 | Athavale et al. | 707/10 |
| 6,868,387 B1 * | 3/2005 | Krueger et al. | 705/7 |
| 6,871,187 B1 * | 3/2005 | Gosko | 705/26 |
| 2001/0047285 A1 * | 11/2001 | Borders et al. | 705/8 |
| 2002/0128946 A1 * | 9/2002 | Chehade et al. | 705/37 |

FOREIGN PATENT DOCUMENTS

WO    WO 99/57664    * 11/1999

OTHER PUBLICATIONS

QAD.com-Application Datasheets, Sales and Distribution, and Product pages (2000), QAD Storefront Informational White Paper (2000), A solution space approach white paper (1999), Archive.org retrieved Nov. 1, 2004.*

Collaborative Applications Power B2B Transactions: Manufacturing Systems B2B Solutions to Command and Control Your Market Supplement, Jul. 2000, p. 2a-6a.*

(Continued)

Primary Examiner—Tariq R. Hafiz
Assistant Examiner—Scott L. Jarrett
(74) Attorney, Agent, or Firm—Chapin IP Law, LLC; Barry W. Chapin, Esq.

(57) ABSTRACT

In an order processing system, mechanisms and techniques receive a change to an existing order in the order processing system and generate a change order based on the existing order. The change order includes the change to the existing order. The system can then compare the change order to the existing order to generate change order result that indicates differences between a change order in the existing order. The system then provides the change order result to at least one recipient such that the recipient may distinguish the differences between a change order in the existing order. Since a change to an existing order can result in changes other than those specifically specified in the received change, the system of the invention allows a person making the change to be presented with the change order results that convey all of the changes that result to the existing order.

17 Claims, 6 Drawing Sheets

OTHER PUBLICATIONS

Gamma, Erich et al., Design Patterns Addison-Wesley Professional, Jan. 15, 1995, ISBN:0201633612, Chapter 1, 4, 5.*
Marchal, Benoit, Applied XML Solutions Sams Professional Publishing, Aug. 29, 2000, ISBN: 0672320541, Chapters 5-7.*
Creating & Releaseing Purchase Order Changes for Standard Orders Checklist, Cornell University, Aug. 1999.*
Stultz, Allen et al., Demystifying EDI Wordware Publishing, Bk&CD-Rom edition, Jan. 15, 2000, ISBN: 1556227086.*
Pearton, Michael, et al., Making real time relevant (Delta Motor in South Africa uses supervisory control to line real-time assembly data with ERP) Manufacturing Systems, Jun. 1999, vol. 17, No. 6, p. 48.*
Kumar, Ashish, Managing Changes in Large Programs AACE International Transactions, 2000, pp. CSC.04.1-CSC.04.08.*

RosettaNet PIP Specification: PIP3A4 Manage Purchase Order RosettaNet, Release 1.3, Oct. 23, 2000.*
RosettaNet PIP Specification: PIP3B5 Request Shipment Change RosettaNet, Release 1.0, Jan. 2, 2001.*
RosettaNet PIP Specification: PIP3A8 Request Purchase Order Change RosettaNet, Release 1.0, Apr. 19, 2001.*
McKie, Stewart, Understanding business objects: using basic building blocks to build better applications DBMS, vol. 8, No. 2, Feb. 1995.*
Coombs Jason et al., Order Processing on Your E-commerce Site MSDN, Aug. 1999.*

* cited by examiner

METHODS AND SYSTEM FOR PROCESSING CHANGES TO EXISTING PURCHASE ORDERS IN AN OBJECT-ORIENTED ORDER PROCESSING SYSTEM

FIELD OF THE INVENTION

The present invention generally relates to mechanisms and techniques for processing data in a computer based order processing system, and more particularly, to systems and techniques which manage changes made to orders in such systems.

BACKGROUND OF THE INVENTION

Conventional computer based order processing systems allow a person to interact with a computer system to place orders for items such as goods or services. Merchants of the items often provide access to such order processing systems over a computer network such as the Internet using a standard set of protocols such as those commonly referred to as the World Wide Web and the hypertext transport protocol (HTTP). For example, a customer of the merchant can, for example, operate web browser software to navigate to a web site that the merchant operates the computer network such as the Internet. The web site can provide an online order processing system to allow the customer to order items offered for sale by the merchant over the Internet.

During the process of placing or entering an order for an item, the customer can typically select or enter values for various properties or attributes associated with the item such as color, quantity, size, a specific configuration, or other order attributes. The customer can also enter payment information such as credit card or bank account information and can enter shipping information including a billing and/or a shipping address. Once this process is complete, the order processing system typically presents a summary of the order to the customer and allows the customer to confirm or decline acceptance of the order. Once the customer accepts the order, the order processing system places the order in a queue of orders waiting to be fulfilled by the merchant.

Fulfillment of the order by the merchant can happen in a number of ways. As a simple example, the order processing system can receive a request from a person working in a merchant facility (e.g., a warehouse or manufacturing facility) for the next order in the queue of orders waiting to be fulfilled. In response to this request, the order processing system can simply print out a copy of the purchase order at the end of the queue and can remove this order from the queue of orders to be fulfilled. The purchase order print out typically contains all of the information provided by the customer to the order processing system concerning the items be purchased, as well as payment and shipping information for the items. The person in receipt of the purchase order can then proceed to fill the order by either retrieving the ordered item(s) from existing merchant stock supplies or by the creating, building, manufacturing or otherwise obtaining the item(s) as specified in the purchase order. Once the person fulfilling the order has retrieved or completed creation of the items specified in the purchase order, the person then packages the items and ships the items to the customer according to the shipping information as specified on the purchase order. The person in the merchant facility can then indicate to the order processing system that the order has been fulfilled and the order processing system can cause payment to be transferred from the customer (e.g., from the credit card of the customer) to a merchant account.

In a conventional order processing system, once an order is accepted by a customer, the order including any associated customer information, item information, shipping information, billing information and so forth is treated as a single entity and is often assigned an order or confirmation number. After submitting an order, if a customer desires to make changes to the existing order, the order processing system typically does not allow such changes to be made to the existing order if the existing order has entered the process of fulfillment. In other words, once the merchant begins the fulfillment process for an order, customers are generally not allowed to make changes to the order.

Certain conventional online order processing systems provide a cut-off time after which time a customer can no longer make changes to an order prior to its fulfillment process. For example, consider a conventional order processing system that allows customers to order groceries over the Internet from a supermarket. An online shopper can navigate to the supermarket web site and can select various items to be delivered to the customer's home at a customer specified date and time. Once the online grocery ordering systems accepts the order of groceries by the shopper, the online order processing system provides a date and time after which no changes may be made by the customer to the grocery order. For example, if the shopper places the grocery order on Monday and requests delivery of the order on the following Friday, the order processing system may indicate to the shopper that changes to the order may be made up until 4 PM Thursday. After 4 PM Thursday however, no changes may be made to the order and a customer will receive a delivery of groceries on Friday as specified in the order as of 4 PM Thursday.

SUMMARY OF THE INVENTION

Conventional order processing systems such as those discussed above suffer from a variety of drawbacks. In particular, in conventional order processing systems, if a customer desires to make a change to an order, the customer's ability to do so is limited by the state of the order within the order processing system at the time that the change is received. For example, if fulfillment of the order has begun, typical conventional order processing systems do not allow changes to be made to an order. This is because the process by which conventional order processing systems fulfill orders is not amenable to change.

Consider the simple grocery ordering system explained above. Once the person in the merchant facility receives the purchase order indicating which grocery items are to be purchased by the customer, the person begins the task of traveling throughout the merchant facility to gather the required grocery items to fulfill the order. If the order processing system were to allow a customer to create a change to the order at that point (i.e., after fullfillment began), the person fulfilling the order within the merchant facility would have no way of knowing about the existence of the change to the order until they returned to the order processing system terminal to indicate the order (the order not including the change) had been fulfilled. Thus, if changes to order were allowed during fullfillment of the orders, the fulfillment process would require that the person fulfilling the order within the merchant facility to continually check-in with the order processing system to determine if any changes were made. This requirement creates inefficiency in the order fulfillment process and thus conventional order processing systems mandate that changes are not allowed to an order after a certain point (e.g., a cut off time) in the order processing and fulfillment lifecycle.

Even if changes are allowed to orders at any point in the processing of the orders by an order processing system (e.g., before fullfillment begins), conventional order processing systems do not effectively communicate how those changes totally affect the pre-existing order. That is, if a change to an order is accepted from a customer by a conventional order processing system prior to the fulfillment process of that order, the conventional order processing system does not typically indicate to the customer all of the information concerning an order that has been altered as a result of the change, in comparison to the information as it existed prior to receipt of the change. In other words, conventional order processing systems do not compare the total effect of how changes made to an existing order differ from the existing order without the changes. This is because a change to an existing order often causes other changes to be made to the existing order. These other changes are not specifically stated or presented in the original change to the existing order as received, for example, from the customer. Conventional order processing systems thus do not simultaneously present to a recipient information concerning the order as it existed before the change in relation to the same information as it exists after the change is carried out. This makes it difficult for a person making a change to an order using a conventional order processing system to understand the complete effect or ramification of how a change will effect an order.

Conversely, embodiments of the invention enable a person (e.g., customer) to make one or more changes to an existing order within an order processing system. Based on such changes, embodiments of the invention create a change order containing the changes and then compare or contrast those changes in the change order with existing information (i.e., unchanged information) in the existing order to produce a change order result. The change order result is then presented to the customer in real-time to allow the customer to better understand the changes that the order undergoes (e.g., during fulfillment of the order or any time after placement of the original existing order).

In particular, embodiments of the invention include method embodiments, apparatus or computer system embodiments, and computer readable medium embodiments which each operate to process orders in order processing systems. One method embodiment of the invention provides a method for processing changes to orders in an order processing system. The method comprises the steps of receiving a change to an existing order and generating a change order based on the existing order. The change order contains the change to the existing order. The method compares the change order to the existing order to generate a change order result that indicates differences between the change order and the existing order. The method then provides the change order result to at least one recipient such that the recipient may distinguish the differences between the change order and the existing order.

According to another method embodiment, the step of generating a change order containing the change to the existing order comprises the steps of copying the existing order to the change order such that the change order contains any objects that exist within the existing order. Each object has at least one attribute and an associated value. The method replaces values of any attributes of objects in the change order with new values for those attributes as indicated in the change to the existing order, such that the change order contains objects having attributes having any new values as indicated in the change to the existing order, while the existing order contains objects having attributes having values that are unchanged. In this manner, the change order includes a copy of the content of an existing order and changes specified within the change are applied to the change order instead of the existing order.

In another embodiment, the step of receiving a change to an existing order comprises the steps of receiving an identification of an existing order which is to be changed and placing a hold on the existing order. Then, the method receives a change signal indicating a new value for an attribute of an object. Also in this embodiment, the step of generating a change order based on the existing order comprises the step of performing, for each object in the existing order for which the change signal indicates a new value for an attribute of that object, the steps of i) copying the object and any attributes and associated values in the existing order to an object in the change order having corresponding attributes and associated values, and ii) assigning the new value as indicated in the change signal to a value of a corresponding attribute of the object in the change order. In this manner, during the generation of the change order, any values contained in the change received replace values of attributes in the change order.

In another embodiment, the step of comparing the change order to the existing order comprises the step of generating a change order result, for each object in the existing order for which the change signal indicates a new value for an attribute of a corresponding object in the change order. Such a change order result that identifies: i) the new value of the attribute of the corresponding object in the change order, and ii) the existing value of the corresponding attribute of the object in the existing order. Accordingly, the change order result conveys the before and after differences of an order in response to receiving the change to the order. This allows, for instance, a customer making a change to an order to see how that change effects all attributes of the order, including the specific attributes specified within by the change, as well as any other attributes which may require alteration based upon the attributes specified to be changed within the change as received from a customer. That is, a change received for an order might cause other parts of the order to be changed as well which are not specifically indicated within the change set forth by the customer. Accordingly, embodiments of the invention that operate in this manner are able to produce a change order result which conveys, displays, indicates, etc. all changes which are made to order in response to the change set forth requested by the customer.

As a specific example, if the customer desires to increase the quantity of items purchased in an order, the customer may provide a change indicating only the change in quantity. Though not specifically stated in this change, the price of the order will inherently change (i.e., will increase) due to the change in quantity requested by the customer (i.e., the change received by the invention). Though this change in price is not specifically stated or put forth in the change requested by the customer (i.e., the change received by the embodiment of the invention), an order processing system will inherently update any other attributes of the order which are affected by the change set forth by the customer. The process of determining which other attributes must be change in relation to a specific attribute specified for change by a customer is outside of the scope of this invention. However, embodiments of the invention will operate to compare any changed attributes of the change order (whether or not specifically specified in the change received from a customer) against corresponding peer attributes of the existing order in order to determine all changes made to the order. The change order result will indicate the differences between existing order and the change order and thus will not only include the change in quantity as specifically specified by the customer, but also will include the change in price which results due to the change in quantity.

In another embodiment of the invention, the step of comparing is done concurrently with the step of generating a change order, such that the step of generating a change order result in the step of comparing is performed during the processing of each object in the existing order for which the change signal indicates a new value for an attribute of that object. In this embodiment then, each change specified in the change to the existing order (i.e. the received change) causes an incremental addition to the change order result which includes any values of attributes that existed prior to the change as well as the new values of those attributes in a change order created as a result of applying a change to the change order.

In another embodiment, the step of comparing the change order to the existing order is done after the step of generating a change order. In this embodiment then, all changes are transposed or put into effect within the change order based upon the existing order prior to the generation of the change order results. In other words, where is in the aforementioned embodiment the change order results are incrementally calculated were generated in response to each attribute change made to an order, this embodiment allows all had to be changes to be made after which the change order result is computed on the entire change order.

In another embodiment, there are multiple objects in the existing order which correspond to the object in the change order having an attribute for which the change signal indicates a new value. In other words, for an object in the change order which receives a change, there may be many corresponding peer or equivalent objects in the existing order which may be compared to the object receiving a change in step of comparison. Accordingly, in this embodiment, the step of comparing generates a change order result that indicates each existing value of the corresponding attribute of each of the multiple objects in the existing order. Is an example, and existing order may contain three objects of the same object data structure type. These may be considered peer objects since they are comparable on an attribute were attribute were object by object basis. Since peer objects contain similar data structure fields, the values of the stated structure fields (e.g., the values of their attributes) will be comparable value by value. In the step of generating, when the change order is created based on existing order, the peer objects are copied to the change order into the change is applied to one or more of the peer objects. Then, in the step of comparing, the object or objects in the change order to which the change is applied (which may be considered a peer object(s)) is/are compared to the peer objects in existing order which correspond to that/those object(s). If there are multiple peer objects in the existing order, and the change order result will reflect an existing value for each of the multiple peer objects as well as the new value of the peer object(s) in the change order which contain the change or changes.

In another embodiment, the step of comparing the change order to the existing order comprises the step of generating a change order result that identifies, for each object having an attribute in the change order that has a different value from an existing value of a corresponding attribute of a corresponding object in the existing order, i) the value of the attribute of the object in change order, and ii) the existing value of the corresponding attribute of the corresponding object in the existing order. This allows the change order result to immediately convey to a recipient the differences between existing order and the change order.

Another embodiment, the step of generating a change order result generates a change order result in a format including at least one of text and a markup language. Accordingly, the change order result can be created (e.g., maintained in memory or in an order database) in a variety of different formats.

In another embodiment, the step of generating a change order result selects the format of the change order result based on an identity of a recipient of the change order result and the step of providing provides the change order result to a recipient in the format selected based on the identity of the recipient. Accordingly, depending upon who is to receive the change order result, embodiments of the invention can produce the change order result, for example, in a text format for one recipient (e.g., for receipt via email) or in an HTML format for another recipient (e.g., for receipt via the World Wide Web) or in an XML format for yet another recipient (e.g., encoded in a proprietary format accessible via XML). The particular format in which the change order result is produced can depend upon the identity of the recipient (e.g., customer, salesperson, manufacturing facility) of the change order result and may be generated in each format required for each of the particular recipients of the change order result.

According to another method embodiment of the invention, the method is provided for comparing order objects. The method comprises the steps of receiving a new value for an existing attribute of an existing peer object in an existing order. The new value preferably specifies a change to an existing order. The method then copies the existing order to a change order such that the change order includes a peer object corresponding to the existing peer object. The peer object includes a peer attribute corresponding to the existing attribute. The method then assigns the new value to the peer attribute of the peer object in the change order, so that the change order includes the change to the existing order while the existing order remains unchanged. The method then compares the existing peer object in the existing order to the peer object in the change order to produce a change order result indicating differences between existing attribute and the peer attribute and provides the change order result to at least one recipient. The recipient can thus conveniently and immediately determine the differences between existing order in the change order based on the change order result.

In another embodiment, the step of comparing invokes comparison logic which performs the steps of receiving an identity of the existing peer object in the existing order and receiving an identity of the peer object in the change order. With these two identities, the method can generate a change order result by comparing an existing value of the existing attribute of the existing peer object in the existing order to the new value of the peer attribute of the peer object in the change order to produce a change order result indicating the new value in comparison to the existing value. The comparison logic is preferably implemented as an object in object oriented order processing system. The comparison logic object can be inherited by any object (e.g., an object in a change order) and can be used to compare differences between that object and an object in one or more peer objects in another order (e.g., an existing order).

In another embodiment, the step of comparing further comprises the steps of determining if any other attributes related to the peer object are changed based on the new value, and if the other attributes are changed, invoking the comparison logic on the peer objects related to those other attributes to produce a change order result indicating the differences between those other attributes.

Another embodiment of the invention includes a method for comparing orders. The method comprises the steps of receiving an identity of an existing order and receiving an identity of a change order. The method generates a change order result by comparing an existing value of an existing attribute of an existing object in the existing order to a value of a peer attribute of a peer object in the change order to produce a change order result indicating differences between the existing order and the change order. A preferred implementation of this embodiment of the invention comprises comparator logic implemented within an object in an object oriented order processing system. Such comparator logic can be invoked by an order comparator process operating within an order process and order processing computer system.

The comparator logic is generic in the sense that it can compare attributes within the objects for which receives identities and can generate or produce change order results which contain the differences between those objects. The comparator logic is not concerned with specific use or purpose of the objects which compares.

In another embodiment of the comparator logic, the comparator logic can compare attributes of peer objects for which receives an identity and can also determine any other objects which those objects inherit (e.g., objects hierarchically related below the peer object for which an identity was received). In other words, if the comparator logic receives the identities of two peer objects (i.e., one in an existing order in one in a change order based in the existing order), it can first compare all attributes those two objects and can then determine any objects which those two objects inherit. The comparator logic can then, a recursive manner, call itself and can pass the identities of the two (or more) inherited objects to this call. The comparator logic processing can thus be repeated to produce a change order result for those two (or more) inherited objects. Likewise, if those two objects being compared the second call (i.e., the first recursive call) to the compare logic also contain relations to or inheritances of other objects, they can be compares well via another call (i.e., a second recursive call) to the comparator logic. This process can continue until all inherited objects within the original two peer objects have had their attributes compared by the comparator logic to produce a single change order result containing the differences between all objects related to the peer objects provided to the compare logic on its first instantiation.

Other embodiments of the invention include computer systems configured to perform all of the method embodiments summarized above and explained herein as the invention. In particular, such computer system embodiments include an order processing computer comprising an interface, a processor, a memory encoded with an order application and an interconnection mechanism coupling the interface, the processor and the memory. The processor performs the order application as an order process to process changes to orders in an order processing system by performing the by performing the operations of the method embodiments disclosed herein as the invention. That is, the invention includes computer systems configured to perform all of the aforementioned method operations disclosed as embodiments disclosed herein.

Generally, embodiments of the invention can perform all of the methods disclosed herein via software control, or via hardware and/or software configured to perform those methods and the techniques.

Other embodiments of the invention that are disclosed herein include software programs to perform the method operations summarized above and disclosed in detail below. More particularly, a computer program product is disclosed which includes a computer-readable medium including order application computer program logic encoded thereon for processing changes to orders in an order processing system, such that the computer program logic, when performed on at least one processor within a computer system, causes the at least one processor to perform the operations (e.g., the method embodiments above, and described in detail later) indicated herein as embodiments of the invention. This arrangement of the invention can be software code and data, logic instructions or the like on a computer readable medium such as an optical medium (e.g., CD-ROM), floppy or hard disk or other such medium such as firmware in one or more ROM or RAM or PROM chips or as an Application Specific Integrated Circuit (ASIC). The software, firmware or other such configurations can be installed onto a computer system to cause the computer system to perform (e.g., via execution, interpretation or other operations) the techniques explained herein as the invention.

It is to be understood that the system of the invention can be embodied strictly as a software program, as software and hardware, or as hardware alone. Is also to be understood that the order processing techniques and mechanisms of this invention typically perform (e.g., execute, run, or are otherwise operated) on computer systems coupled to a computer network such as the Internet. Preferred embodiments of the invention are web-based and receive changes to existing orders via a World Wide Web style browser/web server communications path (e.g., via the hypertext transport protocol HTTP). The invention may be embodied in systems, software and/or hardware products designed, developed and/or manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION OF PREFERRED EMBODIMENTS

Figure 1:
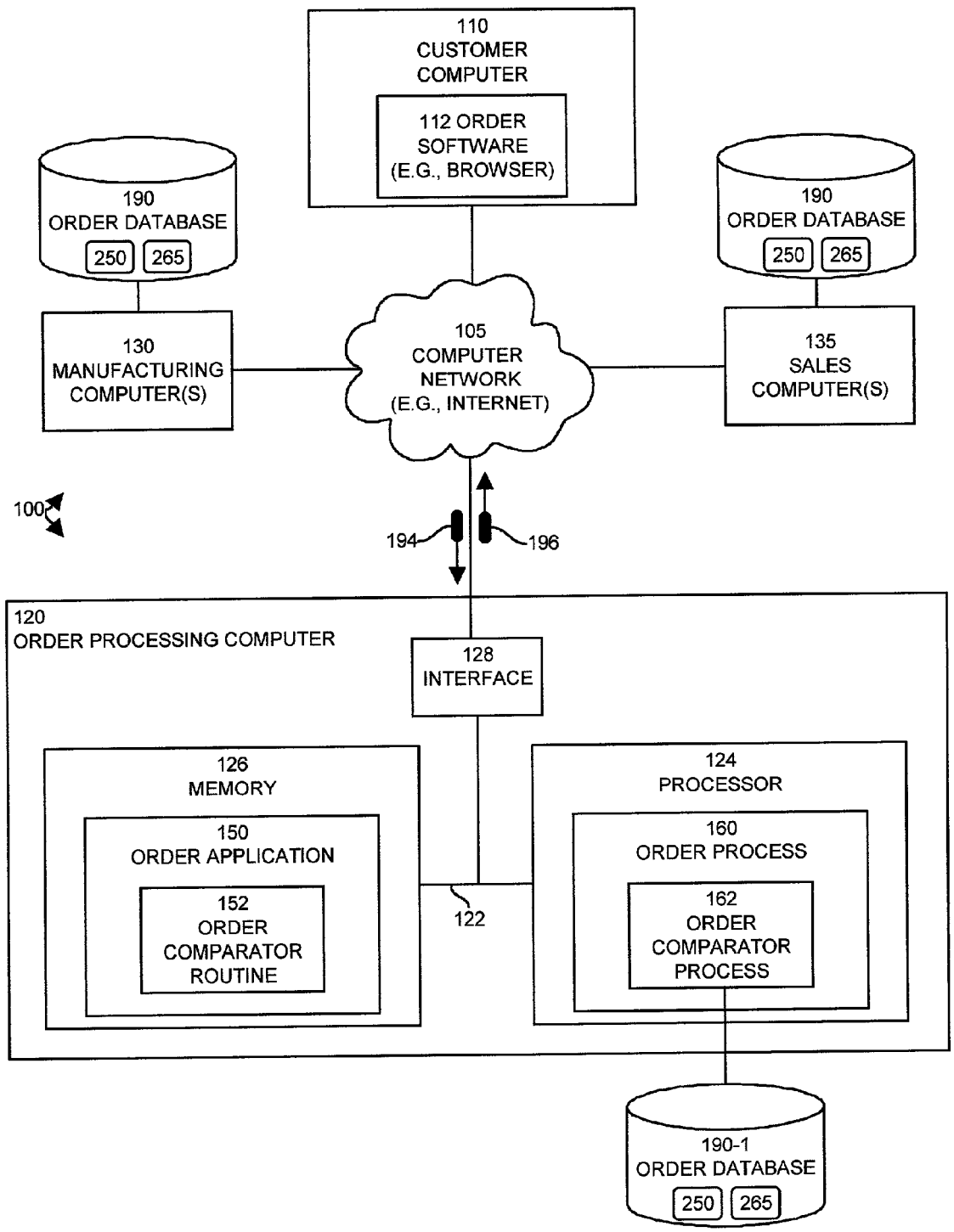
FIG. 1 illustrates a computing system environment including an order processing computer configured according to embodiments of the invention.

Generally, embodiments of the invention enable a customer or other qualified person (e.g., salesperson) to make changes to an existing order within an order processing system. Based on such changes, embodiments of the invention create a change order containing the changes and then the embodiments compare and contrast those changes in the change order with existing information (i.e., unchanged information) in the existing order to produce a change order result. The embodiments then present the change order result to a customer (or other recipient) in real-time to allow the customer to better understand the changes that the order undergoes (e.g., during fulfillment of the order or any time after placement of the original existing order). The embodiments of the invention can customize the change order result for presentation to a recipient in specific formats depending upon the identity of the recipient of the change order result. For example, if the recipient of the change order result is a customer, then embodiments of the invention can present a version of the change order result in hypertext markup language (HTML) format, whereas if the recipient is a manufacturing facility, embodiments of the invention may present a version of the change order result in text or another format as required or preferred by the manufacturing facility.

A preferred embodiment of the invention operates as an order application in an object oriented order processing system. Generally, an order in an object oriented order processing system is represented by an order object which includes a reference to (e.g., inherits) a collection of one or more other objects containing attribute information (i.e., logic and/or data) relating to an order for one or more items. Peer objects exist in such a system. Peer objects are two similar objects (i.e., to instantiations of the same object) and in preferred embodiments of the invention, peer objects are two related objects from different versions of the same order. For instance, when the system of the invention receives a change from a customer to an existing order, the system can generate a change order which is essentially a copy or peer of the existing order, including any objects (data and/or logic) contained in or inherited by the existing order. Thus the change order (i.e., the existing order containing the change) and the existing order (i.e. an unchanged version) are peer order objects which can contain other (e.g., nested or inherited) peer objects having similar content. The objects in the change order however also can preferably include a reference to an order comparator object (explained below) as provided by embodiments of the invention.

After embodiments of the invention produce the change order based on the existing order (e.g., copy an existing order object to a change order object and make the requested change to the change order object or to one or more objects referenced therein), an order comparator process operates to compare attributes of one or more peer objects in the change order and the existing order to detect and determine the effect of the changes made to the change order. The order comparator process produces the changes in the form of a change order result which indicates any new values of attributes of peer objects in the change order as well as the existing or unchanged values of the corresponding attributes as they exist unchanged within the existing order. In this manner, embodiments of the invention can detect all of the changes made to existing order and can present those changes in real-time to the recipient such as a customer, a salesperson or a manufacturing facility.

It may be, for example, that a change requested by a customer effects various other attributes of an order (besides the specifically requested changed attribute(s)) which are unknown to the customer at the moment the customer requests change. For example, a customer might request a change that increases the quantity of an item within an order. As a result of this change, the shipping terms (e.g., overnight versus three day, land or air, shipping costs, etc.) or cost of the items in the order may change as well. Such other changes may take place due to the operation of processing logic that operates within a shipping terms object in the change order. Such processing logic may be is activated when the quantity of the item being ordered changes by a predetermined amount. The point made is that a requested change may result in multiple other changes taking place within various other objects or locations within the change order object (i.e., within the copy of the existing order object). Embodiments of the invention provide mechanisms to detect all of such changes to order information in a change order object and present such changes in relation the unchanged order information (i.e. the order information as it appears prior to receipt of the changes) in the existing order object.

Since object oriented order processing systems frequently undergo modifications, embodiments of the order application and order process of this invention are preferably designed to be generic in that they are able to compare two peer objects no matter what attributes or other objects those peer objects contain or inherit. As such, if an object-oriented order processing system continues to grow during its lifetime of use, for example, via the addition of other object modules added to allow customers to ordering different items, embodiments of the invention can continue to operate to produce change order results which reflected comparison of peer objects from any new object modules edited or added into an existing order processing system. This allows an object oriented order processing system to continue to grow while at the same time operating according to the functionality the invention.

FIG. 1 illustrates a computerized order processing environment 100 that is suitable for use in explaining example embodiments of the invention. The order processing environment 100 includes a computer network 105 which interconnects a customer computer 110, an order processing computer 120, manufacturing computers 130 and sales computers 135.

The customer computer 110 includes order software 112 which may be, for example, web browser software such as Internet Explorer (manufactured by Microsoft Corporation of Redmond, Wash., USA) or Netscape Navigator (manufactured by Netscape Corporation of Mountain View, Calif., USA) which allows a customer (not specifically shown) operating or controlling the customer computer 110 to access the order processing computer 120 via the computer network 105 to place and change orders 250, 265, as will be explained shortly.

The order processing computer 120 includes an interconnection mechanism 122 which couples the processor 124, a memory 126 and an interface 128. The interconnection mechanism 122 the be any type of connection mechanism such as a data bus that can transmit signals (e.g., electronic, optical or the like) between components within the order processing computer 120. The processor 124 may be any type of microprocessor device or central processing unit which preferably operates electronically to process logic instructions. The memory 126 may be any type of computer readable medium or randomly accessible memory device such as a random access memory (RAM) or a read-only memory (e.g., a firmware ROM, PROM, EPROM, and so forth). The memory 126 is encoded with logic instructions and/or data (e.g., software code such as object code) which form an order application 150 which includes an order comparator routine 152.

According to the general operation of the order processing computer 120, the processor 124 is able to access the memory 126 via the interconnection mechanism 122 (e.g., a data bus) to perform (e.g., to execute, run, interpret, or otherwise operate) the logic instructions which form the order application 150 and the order comparator routine 152. As the processor 124 performs the order application 150 including the order comparator routine 152, the processor 124 forms (i.e., operates as) an order process 160 which includes an order comparator process 162, which correspond to the execution of the logic instructions which form the order application 150 and the order comparator routine 152, respectively. That is, the order process 160 represents the order application 150 operating on the processor 124, while the order comparator process 162 represents the order comparator routine 152 within the order application 150 operating on the processor 124.

Generally, in operation of the order processing environment 100, a customer operating the customer computer 110 can control the order software 112 to navigate (e.g., communicate using HTTP) over the computer network 105 to the order processing computer 120 to interact with the order process 160 to place order(s) for item(s) offered for sale by a merchant (not shown). The order process 160 may, for example, operate as (or be served by) a web server on the computer network 105 to which customer computers 110 (only one shown in this example) can communicate with in order to browse item information (e.g., web pages) and place orders for items presented for sale by the order process 160. The order process 160 stores the orders, called existing orders 250, in the order database 190. The manufacturing computers 130 and sales computers 135 also have access to the order database 190 to fulfill or otherwise process the existing orders 250 in the order database 190 at some point in time after placement of the orders by the customers.

As briefly explained above, the order processing environment 100 as configured according to embodiments of the invention allows existing orders 250 to be changed after placement of such orders. An example of a general operation of changing an order 250 after placement of the existing order is described in detail in the co-pending U.S. patent application Ser. No. 09/594,429, entitled "Methods and Apparatus for Modifying a Customer Order," filed Jun. 15, 2000, the entire teachings and contents of which is hereby incorporated by reference in its entirety. Preferred embodiments of the present invention provide a subsystem to the change order system described in the aforementioned reference U.S. Patent Application.

Generally, as illustrated in FIG. 1, a customer can provide a change 194 to existing order 250. The subsystem configured according to embodiments of the present invention which operates within the change order system as explained, for example, in the aforementioned reference patent application, receives such a change 194 to an existing order 250 and in response, generates a new order called a change order 265. The change order 265 contains changes that would otherwise be made to the existing order 250 as a result of receiving a change 194 to the existing order 250. Embodiments of the present invention further operate to produce change order results 196, as shown in FIG. 1. The change order results 196 indicate the changes made to an existing order 250 as a result of a customer providing the change 194.

Figure 2:
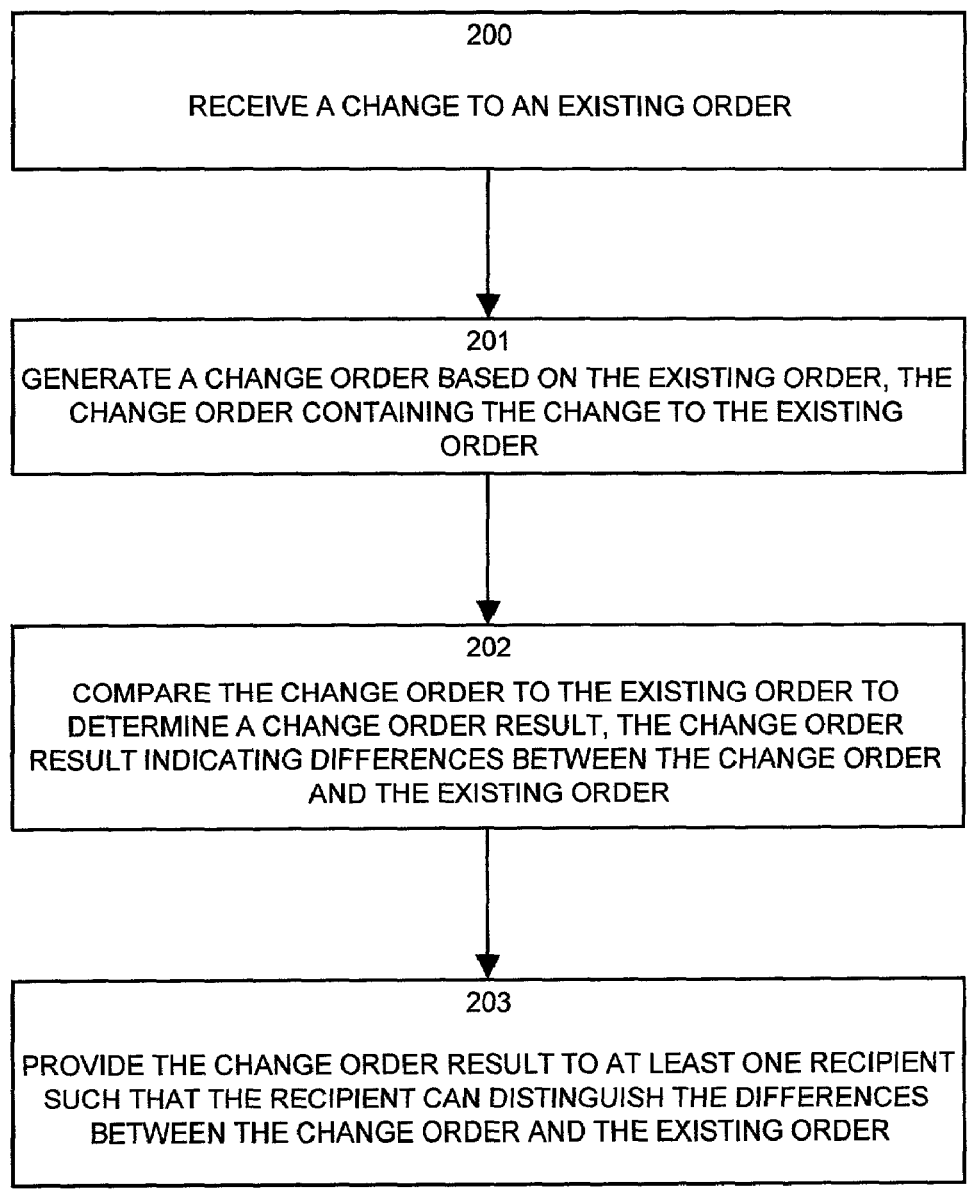
FIG. 2 is a flow chart of processing steps of an order processing system configured in accordance with embodiments of the invention.

FIG. 2 illustrates a flow chart of processing steps 200 to 203 which show the general processing operations performed by an order processing computer 120 configured according to embodiments of the invention, such as that shown in FIG. 1. Generally, the processing steps 200 to 203 represent the instantiation of logic instructions within the order application 150 and the order comparator routine 152 in the memory 126 (or in any other type of computer readable medium such an electronic, magnetic or optical medium). The processing steps 200 to 203 also represent the general operation of the order application 150 and the order comparator routine 152 when performed as one or more operations or methods by the processor 124 (i.e., as the order process 160 and order comparator process 162, respectively). For this example description, the processing steps 200 to 203 will be explained as if they are performed by the order process 160.

In step 200, the order process 160 receives a change 194 to an existing order 250. As will be explained in more detail shortly, the change 194 that the order process 160 receives in step 200 may indicate, for example, a change to one or more attributes of an object within the existing order 250.

Figure 3:
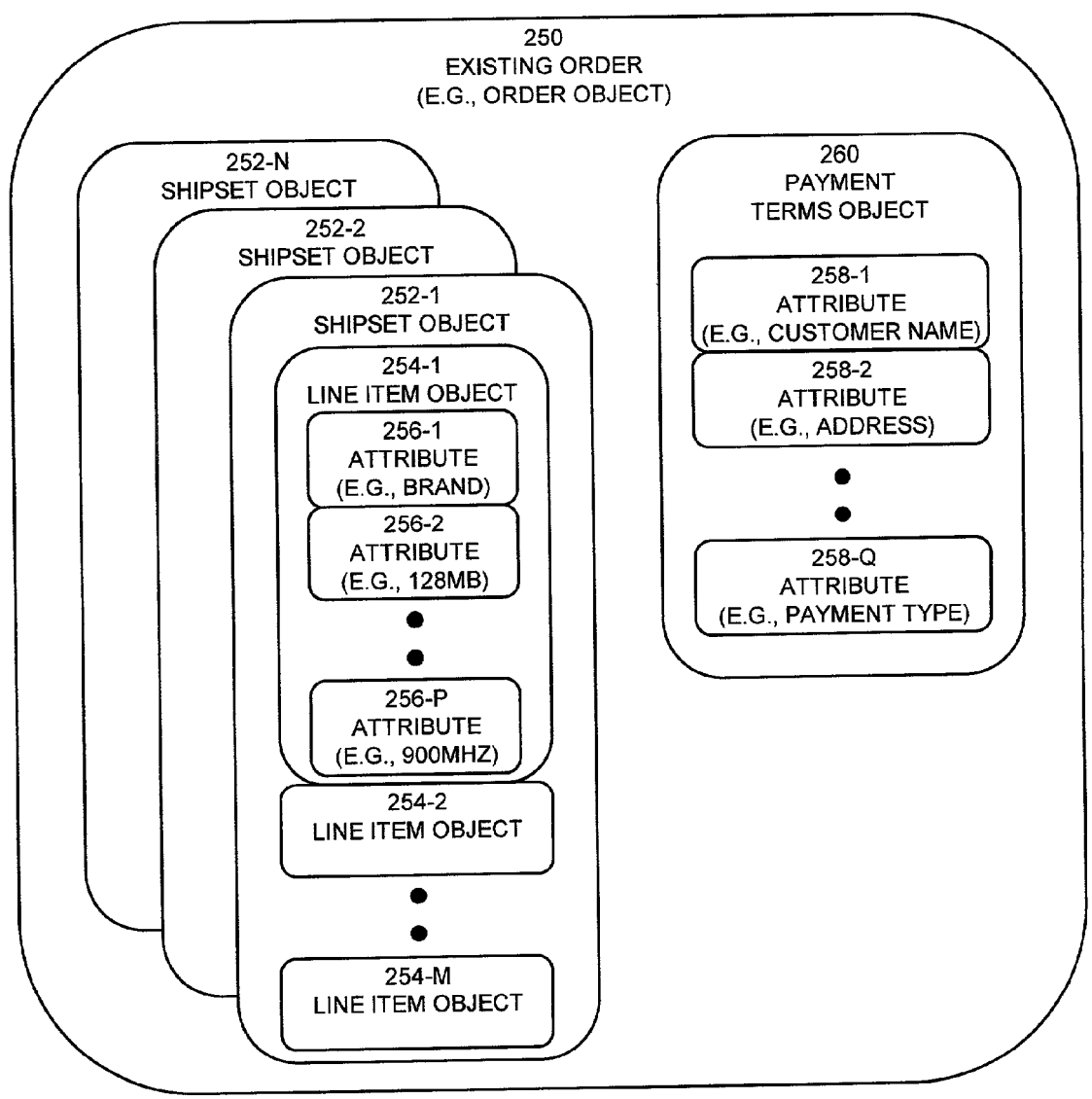
FIG. 3 is an example of an existing order object data structure which inherits various other objects.

Briefly turning attention now to FIG. 3, an example of an existing order 250 is shown. The existing order 250 in this example includes a plurality of shipset objects 252-1 to 252-N and a payment terms object 260.

In this example, each shipset object 252 represents a particular group of items (e.g., products) within the existing order 250 that are to be shipped to a common destination. The example existing order 250 thus specifies a plurality of different groups (shipsets) of items which will be shipped to different destinations. Each particular item or product within each shipset object 252 in the existing order 250 is represented by a line item object 254. In this example, the line item object 254-1 is shown in some detail and contains various attribute objects 256-1 through 256-P. Perhaps the line item object 254-1 represents the description of a personal computer which the customer has ordered. In this case, each attribute 256-1 through 256-P might describe, define or otherwise contain data related to a particular characteristic, aspect or property of the personal computer. In this particular example, the attribute 256-1 describes the brand of personal computer, while attribute 256-2 defines the amount of memory to be included within this personal computer, whereas the attribute 256-P specifies the processor speed (e.g., 900 MHz in this example).

The payment terms object 260 contains attribute objects 258-1 to 258-Q which contains data relating to customer payment information for the customer that submitted the existing order 250. It is to be understood that there may be more or less objects within an existing order 250 and there may be different types of objects other than the ones shown in this example. Furthermore, objects may be referenced by, nested in, related to, or inherited by other objects to create an object hierarchy or tree. This is illustrated in FIG. 3 in which the existing order 250, which is an order object, inherits or references each of the shipset objects 252, which each in turn reference various line item objects 254, which each in turn reference various attribute objects 256. A similar object hierarchy is formed from the existing order 250 with the payment terms object 260 and its related attribute objects 258. It is to be understood that the particular objects chosen for an object hierarchy and the particular contents or purpose of the objects is not strictly important for purposes of the invention. While preferred embodiments of the invention apply in the context of an automated order processing system, it is to be understood that the principles of the invention may be applied to other object oriented processing systems as well which have a requirement to compare two or more objects.

Returning attention now back to the flow chart of processing steps shown in FIG. 2, the order process 160 may carry out the processing of step 200 to receive the change to the existing order 250, for example, by receiving an identification of the existing order 250 which is to be changed, and then by placing a hold on the existing order 250 such that no other changes 194 may be made for a period of time to the existing order 250. The change 194 may be, for example, a change signal indicating a new value for an attribute of an object within the existing order 250.

In step 201, the order process 160 generates a change order 265 based on the existing order 250 in response to the requested change 194. The change order 265 contains, in addition to other things, the requested change 194 to the existing order 250. That is, any changes specified in the change 194 are applied to objects within the change order 265, while objects in the existing order 250 remain unchanged. The processing of step 201 in FIG. 2 which generates a change order 265 based on the existing order 250 and the change 194 is shown graphically in FIG. 4.

Figure 4:
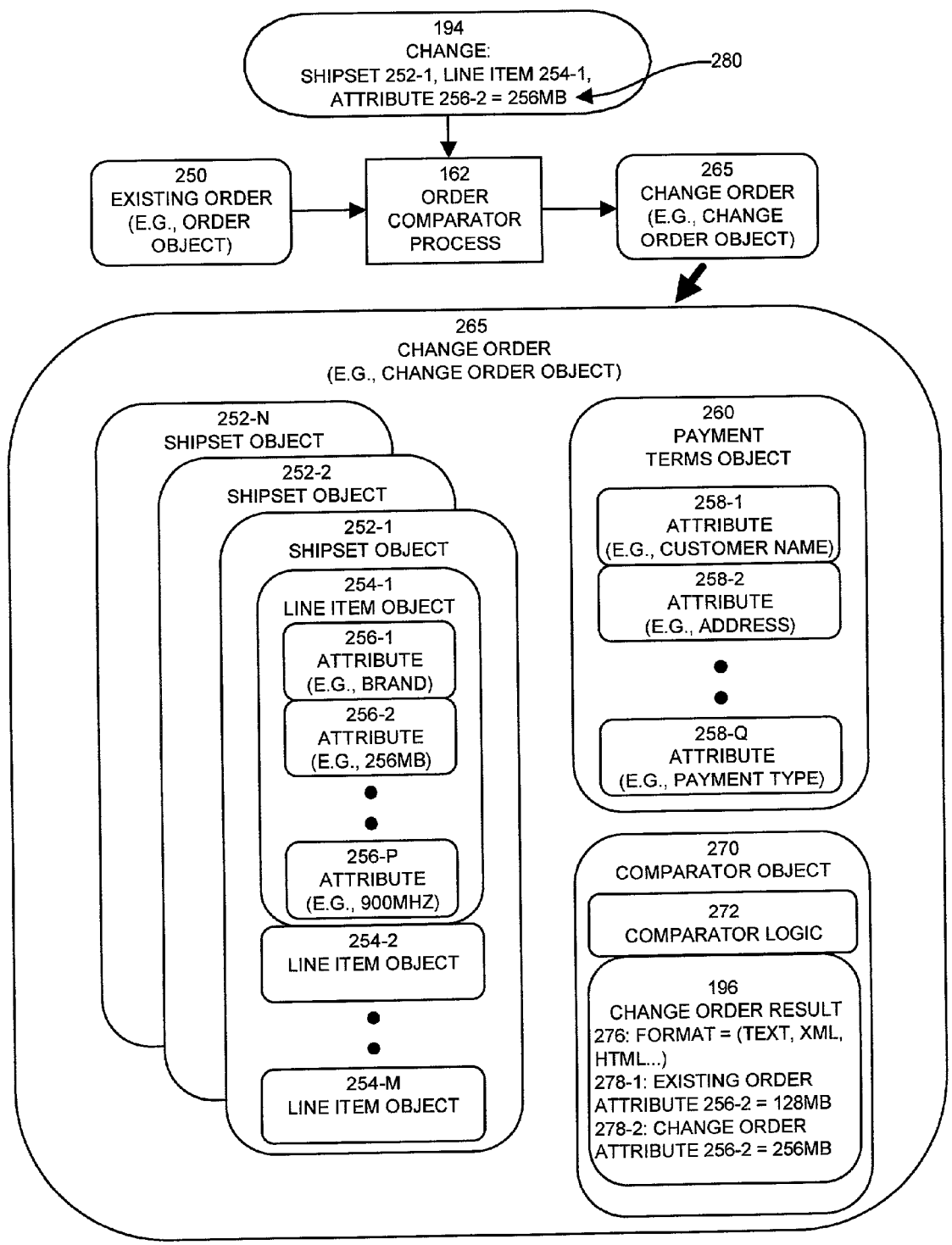
FIG. 4 illustrates an example of how an order comparator process configured according to embodiments of the invention can convert an existing order into a change order upon receipt of a change to the existing order, and further illustrates an example of a change order data structure which corresponds to the existing order illustrated in FIG. 3.

FIG. 4 illustrates details of a change order 265 and generally illustrates how the order comparator process 162 can generate a change order 265 (step 201 in FIG. 2) by receiving as input the existing order 250 and the change 194 and producing as output the change order 265. In this particular example, the change 194 specifies, contains or otherwise identifies a specific alteration 280 that is to be made to the attribute 256-2 (FIG. 3) from "128 MB" (as it exists in the existing order 250) to "256 MB" (as it exists in response to this change 194 in the change order 265).

Certain specific details of how the order comparator process 162 generates a change order 265 based on an existing order 250 and the change 194 will be provided in more detail later. However, it is sufficient for this discussion to state that the change order 265 essentially contains a copy of each object (e.g., shipset objects 252, line item objects 254, payment terms object 260 as well as any other objects) contained within the existing order 250. In other words, the change order 265 is a copy of the existing order 250. The change order 265 also contains however the specific alterations 280 to any attributes, objects or other aspects of the existing order 250, as specified within the change 194.

Returning attention now to step 201, the order process 160 performs the process of generating the change order 265 (i.e., can perform step 201) including changes from the change 194 for example, by copying, each object in the existing order to a corresponding peer object in the change order. Then, for each object in the existing order for which the change 194 indicates a new value for an attribute of that object, the order process 160 can assign the new value (as indicated in the change 194) to a value of a corresponding peer attribute of a peer object in the change order 265, such that the change order 265 contains any changes reflected by the change 194. Once the change order 265 contains all changes reflected by the change 194, processing proceeds from step 201 to step 202 for comparison of the change order 265 to the existing order 250.

In step 202, the order process 160 compares the change order 265 to the existing order 250 to determine or produce a change order result 196. The change order result indicates any differences between the change order 265 in the existing order 250.

Turning attention again to FIG. 4, this figure also illustrates an embodiment of the invention containing a change order result 196. The change order result 196 in this example is included as data within a comparator object 270 this is also referenced by the change order 265. That is, aside from containing a copy of the object content of the existing order 250 and any changes from the change 194, the change order 265 according to this embodiment of the invention further includes a reference to a comparator object 270 which includes comparator logic 272 and the change order result 196.

Generally, according to this embodiment of the invention, the comparator object 270 is an object accessible (e.g., inheritable by) other objects within the order processing system defined by the order process 160. The comparator logic 272 is a set of logic instructions (e.g., software code) which can operate within the order comparator process 162 once the change 194 is in place within the change order 265. That is, the order comparator process 162 triggers the operation of the comparator logic 272 after the order comparator process 162 generates the change order 265 containing the changes defined by the change 194.

In operation (which will be explained more completely with respect to FIG. 6), the comparator logic 272 (i.e., the comparator logic 272 performing in conjunction with the order comparator process 162 operating on the processor 124) is able to receive as input an identity of two or more objects within the order application 150. In preferred embodiments of the invention, the identities of objects provided to the comparator logic 272 are identities of peer objects within the change order 265 and its corresponding or peer existing order 250. In other words, the comparator logic 272 is able to compare two peer objects which are instantiations of the same object data structure. In the example with respect to FIGS. 3 and 4, the comparator logic 272 can receive the identity of the change order 265 as well as the identity of the existing order 250 as input for comparison, or the comparator logic 272 can receive the identities of two (or more) shipset objects 252, lint item objects 254, attribute objects 258, 258, payment terms objects 260 and so forth.

In response to such input, the comparator logic 272 within the comparator object 270 compares the contents of each peer object for which it receives an identity and is able to produce a (or add to an existing) change order result 196 that indicates the differences between the two objects, which in this example can be the existing and change order objects per objects (e.g., 250, 265). In other words, the comparator logic 272 within the comparator object 270 can be included or referenced by the change order 265 to perform a comparison analysis between two or more peer objects (e.g., one or more shipset objects, payment terms objects, attribute objects, line item objects, or the like) in one or more existing orders 250 in relation to their corresponding respective peer objects within the change order 250 in order to produce the change order result 196 which describes or conveys the distinctions between the peer objects.

More specifically then, in step 202, the order process 160 operates (e.g., invokes the logic functionality associated with) the order comparator process 162 which in turn invokes the comparator logic 272 within the comparator object 270 inherited by the change order 265 to compare the change order 265 to the existing order 250 to determine the change order results 196 indicating the differences in the two orders 250, 265.

Next, in step 202 in FIG. 2, once the order process 160 using the mechanisms explained above produces the change order results 196, the order process 160 provides the change order results 196 to at least one recipient such that the recipient can distinguish the differences between the change order 265 and the existing order 250. In the example illustrated in FIG. 1, the order process 160 can convey or transmit the change order result 196 from the order processing computer 120 to each of the manufacturing computers 130, the customer computer 110 and/or the sales computers 135. In this manner, embodiments of the invention allow each of these recipient computer systems (and hence their respective users) to view the differences between the existing order 250 and the change order 265.

Figure 5:
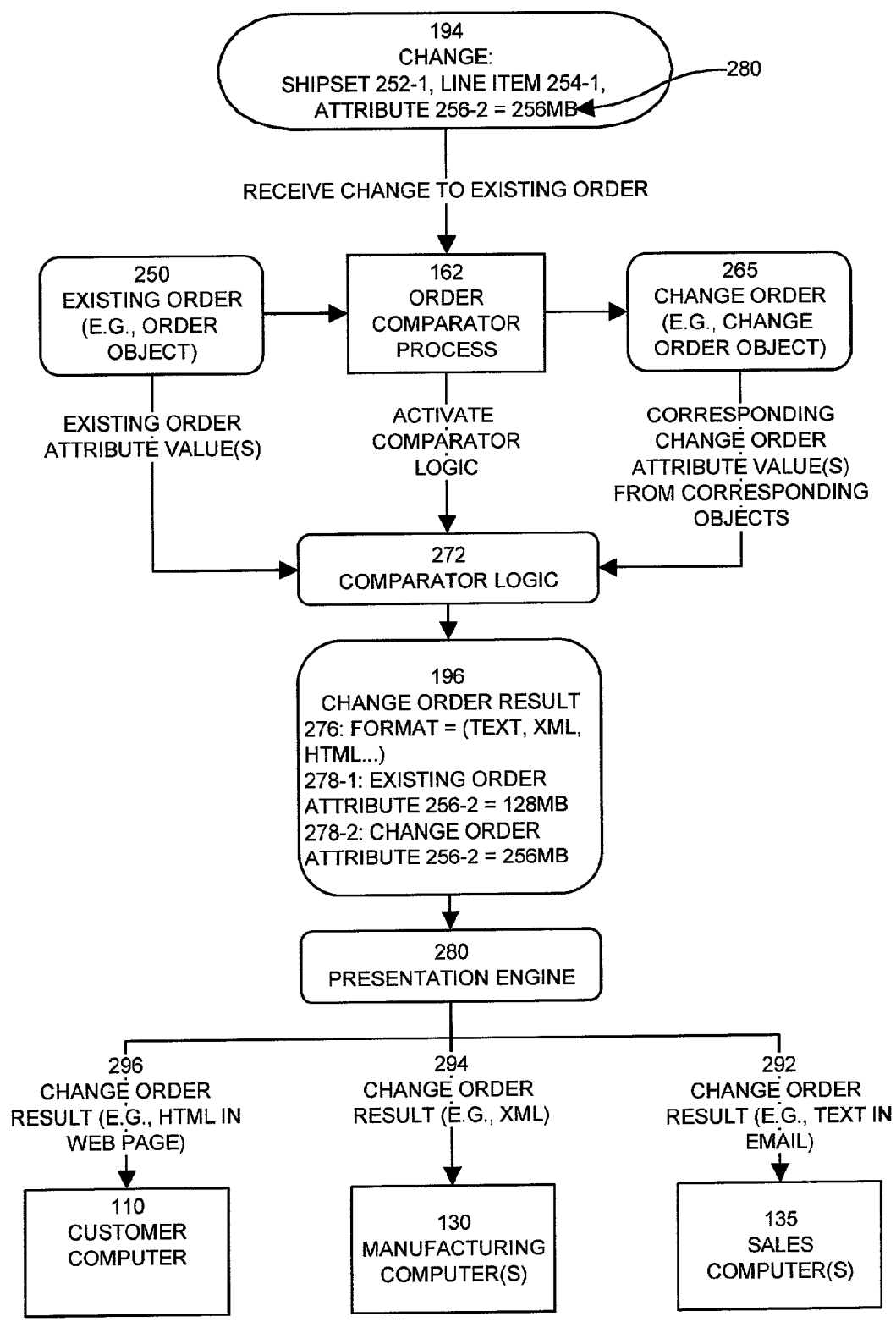
FIG. 5 is a data flow diagram which illustrates the general flow of data and processing operations in an order processing system configured according to an example embodiment of the invention.

FIG. 5 illustrates a data flow diagram which shows the general nature of the processing operations of embodiments of the invention as explained above. Beginning at the top of the diagram in FIG. 5, in this example the change 194 to the existing order contains the specific change 280 (256 megabytes) to the attribute 256-2 that defines a change to the amount of memory for the personal computer defined by the line item 254-1 within the shipset 252-1 within the existing order 250. The order comparator process 162 receives this change 194 (step 200 in FIG. 2) and copies each object 252 through 260 in the existing order 250 (FIG. 3) to a corresponding peer object 252 through 260 in the change order 265 (FIG. 4) and incorporates the specific change(s) 280 (only one shown in this example) into the respective peer objects (attribute 256-2 in the change order 265) to which those changes apply, thus performing the operational step of generating the change order 265 (i.e., step 201 in FIG. 2).

Next, the order comparator process 162 activates (as shown at 282 in FIG. 5) the comparator logic 272 within the comparator object 270 for each object within the change order 265 that contains a change. While not specifically shown in the figures, each object 252 through 260 in the change order 265 may include a change bit, flag or other change indicator that the order comparator process 162 sets to true if, during the process of incorporating the changes 280 with the change 194 (i.e., during the generation of the change order 265), an object 252 through 260 in the change order 265 gets changed, altered or otherwise modified in response to the change 194. In other words, if an object gets changed during the generation of the change order 265, that object can include an indication that it has been changed. Using such a change indicator, the comparator logic 272 in FIG. 5 can compare attributes 282 of one or more peer objects 252 through 260 from the existing order 250 that indicate a change against corresponding change order attribute values from corresponding peer objects 252 through 260 in the change order 265. The comparator logic 272 saves any difference as a result of this comparison into the change order result 196.

In a preferred embodiment, for each difference or change that the comparator logic 272 detects, the change order result 196 can include an identification of the value of the attribute of the object in the change order 265, as well as the existing value of the corresponding attribute of the corresponding object (i.e., the peer object) in the existing order 250. That is, the change order result can include the old value and the new value for a changed attribute, object or other portion of data within a peer object as compared to another peer object.

As illustrated in the example change order result 196 shown FIG. 5, based upon the specific attribute change value 280 within the change 194, the change order result 196 includes the value 278-1 of the existing order attribute 256-2 within the existing order 250, which is "128 MB" in this example, and also contains the value 278-2 of the change order attribute 256-2, which is "256 MB." Since the change order result 196 contains each of these values 278-1 and 278-2, a recipient of the change order result 196 can immediately compare each change made to the existing order 250 via real-time generation and receipt of the change order result 196.

Figure 6:
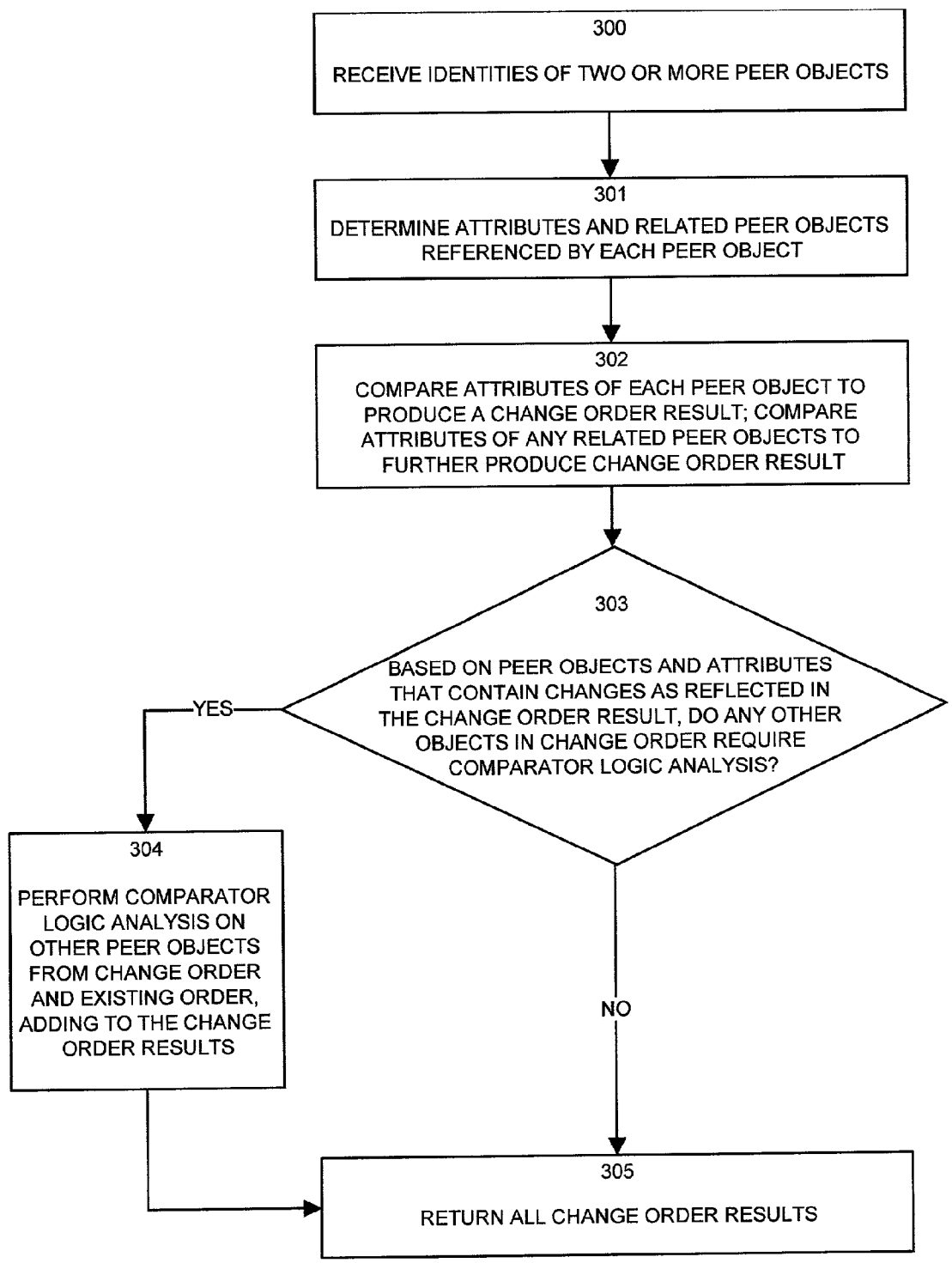
FIG. 6 is a flow chart of processing steps performed by comparator logic within an order process to compare the contents two or more peer objects to produce a change order result according to example embodiment of the invention.

FIG. 6 illustrates a flow chart of processing steps which the comparator logic 272 performs according to an example embodiment of the invention in order to compare two or more peer objects (e.g., existing order object 250 and the change order object 265). The processing shown in FIG. 6 is shown by way of example only and is intended to be somewhat general in nature. It is to be understood that different arrangements of the processing steps may still operate to provide the intended functionality of the operation of these embodiments of the invention. Such variations are intended to be within the scope of this invention.

In step 300, the comparator logic 272 receives the identities of two or more peer objects. In a preferred embodiment of the invention, an identity of an object can be, for example, a pointer, address or other reference to an object data structure in the memory 126. As noted above, by "peer" objects, what is meant is that in preferred embodiments of the invention, the comparator logic 272 receives identities of objects which have a similar object oriented data structure construction. In other words, the objects might have similar attributes, but those attributes in each of the objects may have different values. Stated differently, peer objects are preferably different instantiations (i.e., different values or sets of data) of the same object data structure.

In step 301, the comparator logic 272 determines any attributes and/or related peer objects referenced by each peer object for which an identity was received in step 300. Preferred embodiments of the comparator logic 272 are able to examine and compare the entire contents (e.g., the entire set of objects, attributes, and any inherited or referenced objects as well as those object's attributes) of each peer object for which an identity was received in step 300. As an example, if in step 300, the comparator logic 272 received the identities of both the existing order object 250 and the change order object 265, then in step 301, the comparator logic 272 can determine any attributes of those object 250, 265, as well as any peer objects contained within, referenced by or inherited by those objects 250, 265. In the case of order objects 250 and 265 as illustrated in FIGS. 3 and 4, step 301 can determine, for example, that the shipset objects 252-1 through 252-N in the existing order object 250 correspond with, or are peer objects to, the shipset objects 252-1 through 252-N within the existing order object 265. Likewise, the payment terms object 260 within the existing order object 250 is a peer object to the payment terms object 260 within the change order object 265. To this end, in step 301 the comparator logic can determine the identities of any subobjects which are peers with each other within the peer objects for which it receives identities.

Once the comparator logic 272 has determined the set of attributes and related peer objects for each order object 250, 265 (i.e., for each peer object), in step 302, the comparator logic 272 compares any attributes of each peer object 250, 265 to produce a change order result 196. Also in step 302, the comparator logic 272 compares any attributes of any of the related peer objects (as determined or discovered in step 301) in order to further produce additional change order results 196. In other words, in step 302, the comparator logic 272 compares the values of all object data structures within and inherited by the peer objects for which identities were received in step 300. Such a comparison can be, for example, a data field by data field comparison of values of the fields in each object. String comparisons, numerical comparisons, size comparisons or any other type of comparison may be used for this purpose. The comparator logic 272 detects any differences in the data fields (e.g., in the attributes, if the attributes are data) during such a comparison process and saves such difference within the change order results 196.

As noted above, in a preferred embodiment of the invention, when the comparator logic 272 discovers a difference during this comparison process in step 302, the comparator logic 272 can include each value for each differing data structure for each peer object. In this manner, the change order result 196 not only indicates the differences between peer objects, but does so by indicating the values data (e.g., attributes) within each peer object. Accordingly, a recipient of the change order result 196 can compare and contrast the old and new values of attributes of objects that have changed, for example, between an existing order 250 and the change order 265.

Next, in step 303, the comparator logic 272 makes a determination if any other objects in the change order 265 require processing of the comparator logic analysis as performed within step 301 in step 302, based on the peer objects and the attributes that contain changes as reflected in the change order results 196. Stated differently, in step 303, the comparator logic 272 can determine if the changes made to the change order 265 as defined within the change 194 have any effect upon any other objects within the change order 265, other than the specific objects to which those changes relate. By way of example, if a customer provides a change 194 to the quantity of an item within an order, then perhaps the payment terms object 260 which contains a price attribute (not specifically shown) might contain changes as well. The process by which the price attribute gets updated in response to receipt of a change 194 that alters the quantity of an item is beyond the scope of the present invention. However, should attributes or data related to other objects within the change order 265 be altered, in addition to those specified for alteration within the change 194, step 303 detects is such other objects may have changed as well.

Such a determination may be made in step 303, for example, by having related objects maintain a link between each other. Thus, if a change 194 specifies a specific alteration 280 to the quantity of an item, then the object that defines the quantity of the item for the order can contain a link to the price of the item. Accordingly, if order process 160 alters the object defining quantity in response to receiving the alteration 280 in the change 194, and this quantity object is analyzed for change via comparator logic processing as a per object, the comparator logic can detect the related link in step 302 to the price object and can perform a similar comparator logic analysis on the price object. In this manner, if an object changes in response to a change 194, any objects that change as an indirect result of the specific change 280 can be detected via linking of objects in relationships.

As such, if other objects exist which contain indirect changes not specifically stated within the change 194 (as detected in step 303 above), processing proceeds to step 304 at which point the comparator logic 272 operates in a recursive manner (e.g., by calling itself using the identities of any other peer objects discovered in step 303) to perform comparator logic analysis on the other peer objects from the change order 265 against the existing order 250. The comparator logic 272 adds the results to the change order results 196. In this manner, if the change 194 indirectly alters other objects within an order besides the object(s) specifically referenced by the change 194, steps 303 and 304 can detect these other changes and can incorporate these changes into the change order result 196 for a complete representation of the entire set of changes made to an order in response to receipt of the change 194.

After processing either step 303 or step 304, comparator logic processing proceeds to step 305 at which point the comparator logic 272 returns the entire set of change order results 196 back to the calling entity, which in this example is the order comparator process 162. The comparator logic 272 can operate in this manner to produce a comprehensive set of change order results 196 that reflect any changes between two or more peer objects and all objects to which those peer object relate. If more than two peer objects are compared according to the aforementioned processing, the change order result 196 can contain the different values for each of the peer objects. Thus, for example, if there are four peer objects that the comparator logic 272 compares against each other and there is a difference between those objects, the difference is expressed by the presence of four values 278-1 through 278-4 (not shown in figures), one for each of the four differing values (e.g., attributes) of each of the four peer objects.

Returning attention now back to FIG. 2, after the aforementioned processing determines a set of change order results 196 (e.g., step 202 in FIG. 2), in step 203, the order process 160 provides the change order result 196 to at least one recipient such that the recipient can distinguish the differences between the change order 250 and the existing order 265.

In the embodiments of the invention as illustrated in FIG. 5, processing step 203 is accomplished by the presentation engine 290. The presentation engine is part of the order process 160 and operates to receive the change order result 196 and distribute the change order result 196 to one or more recipients. Recipients can include, in this example, the customer computer 110, one or more manufacturing computers 130, as well as one or more sales computers 135.

In a preferred embodiment of the invention as illustrated in FIG. 5, the presentation engine 290 may format the change order result 196 in a variety of different formats such as text (e.g., for distribution via e-mail), a markup language such as HTML (e.g., for distribution via HTTP over the World Wide Web) or in another prescribed format such as a proprietary format (e.g., transmitted via XML), as may be required by the manufacturing computers 130. The presentation engine 290 can distribute the change order result 196 according to a specific format (e.g., text, HTML, XML or another format) that is based on the identity of the recipient. In this manner, each recipient, who may be interested in a specific aspect or format of the change order result 196 can receive the change order result 196 in a preferred format for greatest ease-of-use.

In an alternative embodiment of the invention, the comparator logic 272 that generates the change order result 196 may create a version of the change order result 196 in each of the different formats based upon the identities of any recipients that are intended to receive the change order result 196. Such an alternative embodiment is illustrated by way of example in FIG. 5 in which the change order result 196 includes a format field 276 that defines a specific format for storage and/or transmission of the change order result 196 by the presentation engine 290. In this example, formats can include text 292, and/or a markup language such as XML 294 and/or HTML 296 as well as other formats not specifically shown.

In embodiments which use the format field 276, the comparator logic 272 may produce a text only version of the change order result 196, for example, for distribution the e-mail to the sales computers 135 and may also produce in HTML version (e.g., a web page) of the change order result 196 for distribution back to the customer computer 1110 that initially requested the change 194 to the existing order 250. It is to be understood that the invention is not limited in this manner and embodiments of the invention are intended to operate by either having the comparator logic 272 produce a single version of the change order result 196 which the presentation engine 290 thereafter formats into any required formats based on the identities of the intended recipients, or, the comparator logic 272 may concurrently produce separate versions of the change order results 196 in each of the required formats 292, 294, 296, etc.

According to the aforementioned embodiments of the invention, such embodiments are thus able to receive changes 194 to existing order 250 within an order processing system and are able to make such changes to the existing order 265 in real-time and then report the specific changes made as a set of change order results 196 which include the old values of information that existed in the existing order 250 prior to receipt of the change 194 as well as the new values which now exist within the change order 265 as a result of incorporating the change 194 into the existing order 250. In this manner, the recipients of the change order result 196 are able to instantly verify and perceive how a specific change 194 will affect an order for an item within the order processing system 100.

Those skilled in the art will understand that there can be many variations made to the operations, techniques and mechanisms explained above while still achieving the same objectives of the invention. Such variations are intended to be covered by the scope of this invention.

As an example, while the aforementioned example embodiments of the change order 265 as shown in FIG. 4 include a single comparator object 270, other embodiments of the invention can access separate instantiations of the comparator object 270 from within each object that contains a change as a result of the receipt of the change 194 to the existing order 250. That is, while the aforementioned example embodiments have been explained with reference to the comparator object 270 included within, inherited by or referenced only once within the change order object 265, alternative embodiments of the invention can reference the comparator object 270 within each object (e.g., within a shipset object 252, a line item object 254, and individual attribute 256, 258, or any other individual object) that contains any change from its corresponding peer object within the existing order 250. In this manner, as the order comparator process 162 copies each object and all of its values from the existing order 250 to the change order 265 and incorporates any specific changes 280 within the change 194 into the various objects as they are copied (e.g., during via generation of the change order), the order comparator process 162 can also include, in any object containing such a change, a reference to an instantiation of the comparator object 270 in order for that object to operate the comparator logic 272 to compare itself against the corresponding peer object within the existing order 250. Once an object is copied, the order comparator process 162 can trigger the activation of the comparator logic 272 to add to the setoff change order results 196. This alternative embodiment of the invention avoids the requirement of the comparator logic processing steps shown in FIG. 6 from having to detect any related peer object referenced by each peer object in step 301.

The foregoing description of embodiments of the invention are not intended to be limiting. Rather, any limitations to embodiments of the invention are presented in the following claims.

What is claimed is:

1. A method for processing changes to purchase orders of items offered for sale in an object oriented order processing system, the method comprising the steps of:

receiving a change to an existing purchase order at said order processing system, said change a result of a request by a customer, said order represented by an order object including a reference to a collection of objects containing attribute information;

generating, by said order processing system, a change order based on the existing purchase order, the change order containing the change to the existing purchase order;

comparing, at said order processing system, the change order to the existing purchase order to generate a change order result referencing an order comparator object that indicates differences between the change order and the existing order, and determining if any other attributes related to the change order are changed based on the change order, and if the other attributes are changed, then supplementing the change order result to indicate the differences between those other attributes, wherein the step of comparing the change order to the existing order comprises the step of:

for each object in the existing order for which the change signal indicates a new value for an attribute of a corresponding object in the change order, generating a change order result that identifies:

i) the new value of the attribute of the corresponding object in the chance order; and ii) the existing value of the corresponding attribute of the object in the existing order, and wherein the step of comparing is done concurrently with the step of generating a change order, such that the step of generating a change order result in the step of comparing is performed during the processing of each object in the existing order for which the change signal indicates a new value for an attribute of that object; and providing, from said order processing system, the change order result to said customer such that the customer is capable of distinguishing the differences between the change order and the existing purchase order of items offered for sale.

2. The method of claim 1 wherein the step of generating a change order containing the change to the existing order comprises the steps of:

copying the existing order to the change order such that the change order contains any objects that exist within the existing order, each object having at least one attribute and an associated value; and replacing values of any attributes of objects in the change order with new values for those attributes as indicated in the change to the existing order, such that the change order contains objects having attributes having any new values as indicated in the change to the existing order, while the existing order contains objects having attributes having values that are unchanged.

3. The method of claim 1 wherein the step of receiving a change to an existing order comprises the steps of:
   receiving an identification of an existing order which is to be changed;
   placing a hold on the existing order;
   receiving a change signal indicating a new value for an attribute of an object; and
   wherein the step of generating a change order based on the existing order comprises the step of:
      for each object in the existing order for which the change signal indicates a new value for an attribute of that object, performing the steps of:
         i) copying the object and any attributes and associated values in the existing order to an object in the change order having corresponding attributes and associated values; and
         ii) assigning the new value as indicated in the change signal to a value of a corresponding attribute of the object in the change order.

4. The method of claim 1 wherein the step of comparing the change order to the existing order is done after the step of generating a change order.

5. The method of claim 1 wherein:
   there are multiple objects in the existing order which correspond to the object in the change order having an attribute for which the change signal indicates a new value; and
   wherein the step of comparing generates a change order result that indicates each existing value of the corresponding attribute of each of the multiple objects in the existing order.

6. The method of claim 1 wherein the step of comparing the change order to the existing order comprises the step of:
   for each object having an attribute in the change order that has a different value from an existing value of a corresponding attribute of a corresponding object in the existing order, generating a change order result that identifies:
      i) the value of the attribute of the object in change order; and
      ii) the existing value of the corresponding attribute of the corresponding object in the existing order.

7. The method of claim 6 wherein the step of generating a change order result generates a change order result in a format including at least one of text and a markup language.

8. The method of claim 7 wherein the step of generating a change order result selects the format of the change order result based on an identity of a recipient of the change order result and wherein the step of providing provides the change order result to a recipient in the format selected based on the identity of the recipient.

9. An order processing computer comprising:
   an interface;
   a processor;
   a memory encoded with an order application; and
   an interconnection mechanism coupling the interface, the processor and the memory;
   wherein the processor performs the order application as an order process to process changes to purchase orders in an object oriented order processing system, said object oriented order processing system having an order object including a reference to a collection of multiple objects containing attribute information, by performing the operations of:
      receiving, via the interface, a change to an existing purchase order, the existing purchase order existing in an order database accessible to the order process, said change a result of a request by a customer;
      generating, in the memory, a change order based on the existing purchase order, the change order containing the change to the existing purchase order and including a reference to an order comparator object;
      comparing the change order to the existing purchase order to generate a change order result in the memory that indicates differences between the change order and the existing purchase order, and determining if any other attributes related to the change order are changed based on the change order, and if the other attributes are changed, then supplementing the change order result to indicate the differences between those other attributes, wherein when the order process performs the operation of receiving a change to an existing order, the order process performs the operations of:
      receiving an identification of an existing order which is to be changed;
      placing a hold on the existing order;
      receiving a change signal via the interface indicating a new value for an attribute of an object; and
   wherein when the order process performs the operation of generating a chance order based on the existing order, the order process performs the operations of:
      for each object in the existing order in the memory for which the change signal indicates a new value for an attribute of that object, performing the steps of:
         i) copying the object and any attributes and associated values in the existing order to an object in the change order in the memory having corresponding attributes and associated values; and
         ii) assigning the new value as indicated in the change signal to a value of a corresponding attribute of the object in the chance order, and wherein the order process performs the operation of comparing concurrently with the operation of generating a change order, such that the operation of generating a change order result in the operation of comparing is performed during the processing of each object in the existing order for which the change signal indicates a new value for an attribute of that object; and
      providing the change order result to said customer via the interface, such that the customer is capable of distinguishing the differences between the change order and the existing order.

10. The order processing computer of claim 9 wherein when the order process performs the operation of generating a change order containing the change to the existing order, the order process performs the operations of:
   copying the existing order to the change order in the memory such that the change order contains any objects that exist within the existing order, each object having at least one attribute and an associated value; and
   replacing values of any attributes of objects in the change order in the memory with new values for those attributes as indicated in the change to the existing order, such that the change order contains objects having attributes having any new values as indicated in the change to the existing order, while the existing order contains objects having attributes having values that are unchanged.

11. The order processing computer of claim 9 wherein when the order process performs the operation of receiving a change to an existing order, the order process performs the operations of:
  receiving an identification of an existing order which is to be changed;
  placing a hold on the existing order;
  receiving a change signal via the interface indicating a new value for an attribute of an object; and
wherein when the order process performs the operation of generating a change order based on the existing order, the order process performs the operations of:
  for each object in the existing order in the memory for which the change signal indicates a new value for an attribute of that object, performing the steps of:
    i) copying the object and any attributes and associated values in the existing order to an object in the change order in the memory having corresponding attributes and associated values; and
    ii) assigning the new value as indicated in the change signal to a value of a corresponding attribute of the object in the change order.

12. The order processing computer of claim 9 wherein the order process performs the operation of comparing the change order to the existing order after the step of generating a change order.

13. The order processing computer of claim 9 wherein:
  there are multiple objects in the existing order in the memory which correspond to the object in the change order having an attribute for which the change signal indicates a new value; and
  wherein when the order process performs the operation of comparing, the order process generates a change order result in the memory that indicates each existing value of the corresponding attribute of each of the multiple objects in the existing order.

14. The order processing computer of claim 9 wherein when the order process performs the operation of comparing the change order to the existing order, the order process performs the operations of:
  for each object having an attribute in the change order that has a different value from an existing value of a corresponding attribute of a corresponding object in the existing order in the memory, generating a change order result in the memory that identifies:
    i) the value of the attribute of the object in change order; and
    ii) the existing value of the corresponding attribute of the corresponding object in the existing order.

15. The order processing computer of claim 9 wherein when the order process performs the operation of generating a change order result, the order process generates a change order result in a format including at least one of text and a markup language.

16. The order processing computer of claim 15 wherein when the order process performs the operation of generating a change order result, the order process selects a format of the change order result based on an identity of a recipient of the change order result.

17. The order processing computer of claim 16 wherein when the order process performs the operation of providing, the order process provides the change order result from the memory to a recipient via the interface according to a format based on the identity of the recipient.

\* \* \* \* \*